(12) United States Patent
Xu et al.

(10) Patent No.: US 7,121,581 B2
(45) Date of Patent: Oct. 17, 2006

(54) SWITCH ASSEMBLY FOR AN AIRBAG MODULE ATTACHMENT

(75) Inventors: Xiaoping Xu, Rochester Hills, MI (US); Jason Luo, Troy, MI (US); Adolfo Ridolfi, Verona (IT); Federico Girardi, Verona (IT); Giuseppe Testa, Illasi (IT)

(73) Assignee: Key Safety Systems, Inc., Sterling Heights, MI (US)

( * ) Notice: Subject to any disclaimer, the term of this patent is extended or adjusted under 35 U.S.C. 154(b) by 334 days.

(21) Appl. No.: 10/999,482

(22) Filed: Dec. 1, 2004

(65) Prior Publication Data

US 2005/0200104 A1    Sep. 15, 2005

Related U.S. Application Data

(62) Division of application No. 10/340,672, filed on Jan. 13, 2003, now Pat. No. 6,860,509.

(60) Provisional application No. 60/355,494, filed on Feb. 8, 2002.

(51) Int. Cl.
  *B60R 21/16* (2006.01)
(52) U.S. Cl. .................. 280/731; 280/728.2; 200/61.55
(58) Field of Classification Search ................ 280/731, 280/728.2; 200/61.54, 61.55, 61.57, 520, 200/341, 344, 345, 61.56, 16 R, 16 A, 16 C, 200/243
See application file for complete search history.

(56) References Cited

U.S. PATENT DOCUMENTS

| | | | | |
|---|---|---|---|---|
| 5,120,923 A | * | 6/1992 | Kato et al. | 200/520 |
| 5,201,824 A | * | 4/1993 | Kato et al. | 200/520 |
| 5,203,448 A | * | 4/1993 | Osada et al. | 200/517 |
| 5,386,091 A | * | 1/1995 | Clancy | 200/517 |
| 5,710,397 A | * | 1/1998 | Liao | 200/5 A |
| 5,931,492 A | * | 8/1999 | Mueller et al. | 280/728.2 |
| 6,086,090 A | * | 7/2000 | Fischer | 280/728.2 |
| 6,156,986 A | * | 12/2000 | Tsai | 200/345 |
| 6,204,462 B1 | * | 3/2001 | Huang | 200/345 |
| 6,257,615 B1 | * | 7/2001 | Bohn et al. | 280/728.2 |
| 6,284,992 B1 | * | 9/2001 | Richter | 200/344 |
| 6,300,582 B1 | * | 10/2001 | Huang | 200/302.2 |
| 6,312,012 B1 | * | 11/2001 | Bohn et al. | 280/731 |
| 6,455,795 B1 | * | 9/2002 | Murakami et al. | 200/345 |
| 6,554,312 B1 | * | 4/2003 | Sakane et al. | 280/728.2 |
| 6,664,491 B1 | * | 12/2003 | Yanai et al. | 200/516 |
| 6,682,092 B1 | * | 1/2004 | Schutz et al. | 280/731 |
| 6,844,509 B1 | * | 1/2005 | Tsuchiya et al. | 200/5 A |
| 2004/0041372 A1 | * | 3/2004 | Helmstetter | 280/728.2 |
| 2004/0108690 A1 | * | 6/2004 | Schutz et al. | 280/728.2 |

* cited by examiner

*Primary Examiner*—Paul N. Dickson
*Assistant Examiner*—Joselynn Y. Sliteris
(74) *Attorney, Agent, or Firm*—Lonnie Drayer

(57) ABSTRACT

A vehicle steering wheel assembly having a molded armature with outwardly extending spokes for mounting on a steering column. Airbag module engagement members extend from an airbag module housing to engage corresponding armature engagement members. The airbag module rests on a multiple of switch assemblies while the engagement members are separated by a clearance. The engagement members are only in contact if the airbag is fired. A clearance between each armature engagement member and each corresponding airbag module engagement member assures that there is no interference that may result in undesirable noise or vibration.

3 Claims, 18 Drawing Sheets

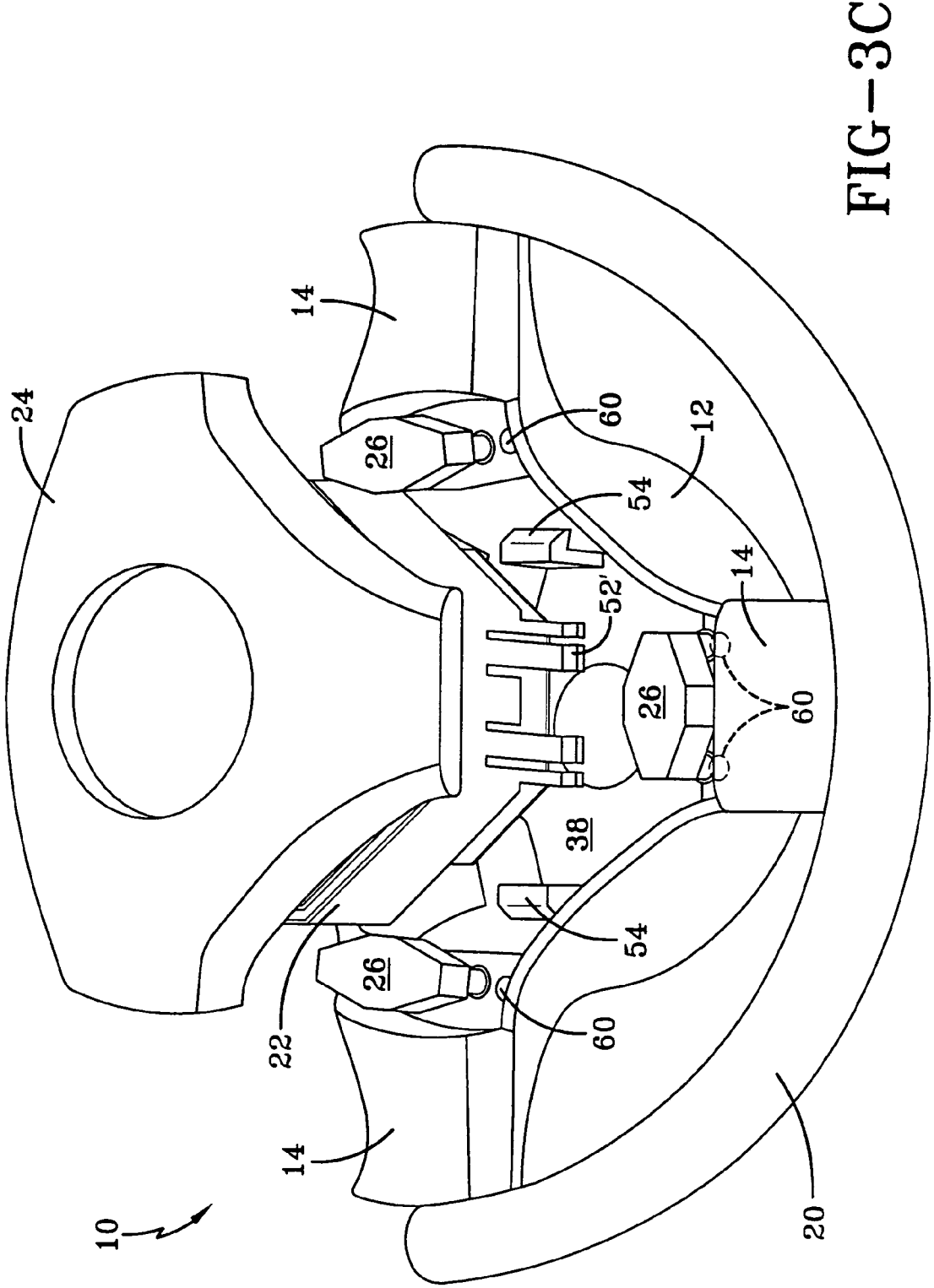

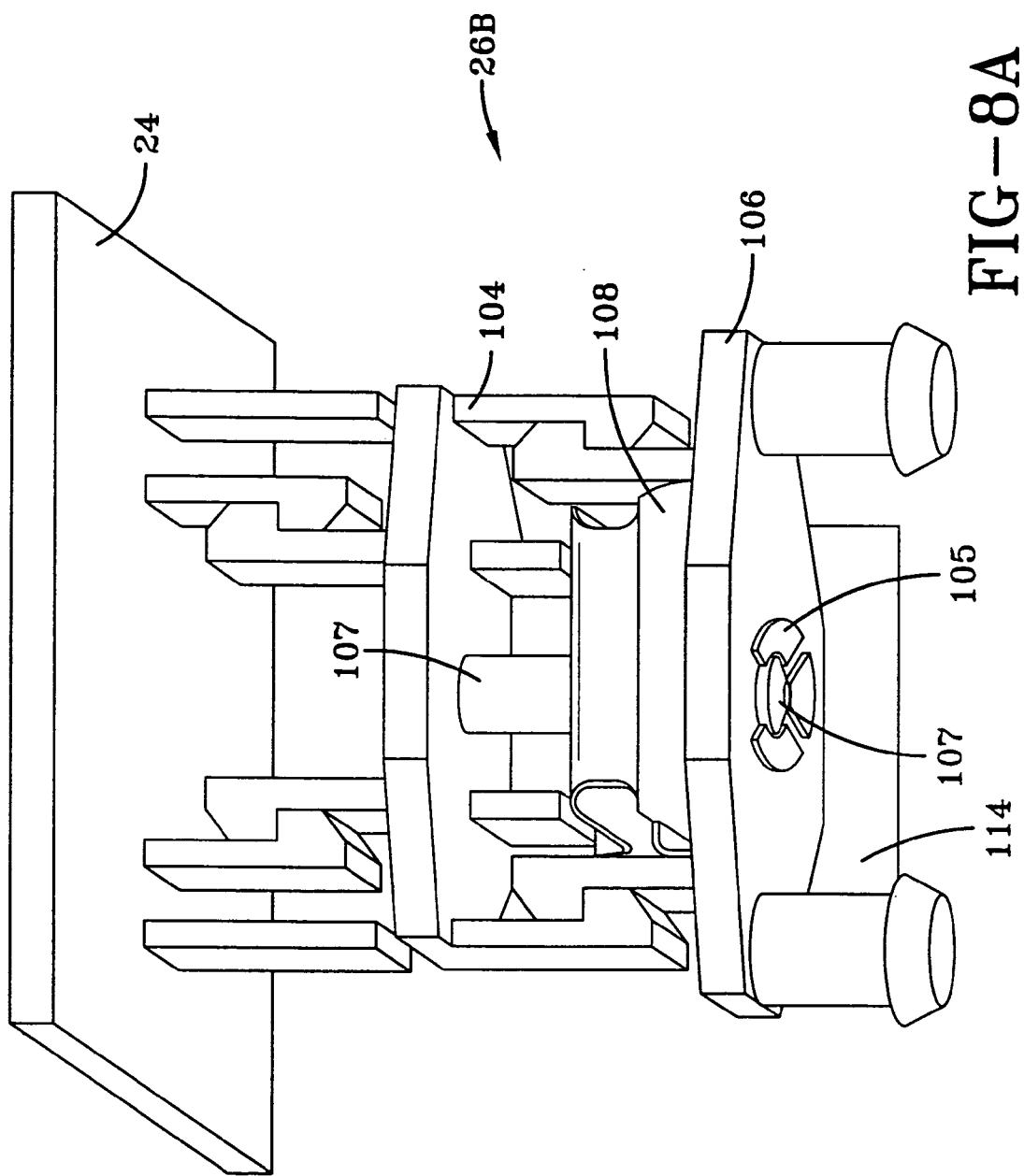

SWITCH ASSEMBLY FOR AN AIRBAG MODULE ATTACHMENT

This is a Divisional of application Ser. No. 10/340,672, filed Jan. 13, 2003, now U.S. Pat. No. 6,860,509 B2, which claimed priority of provisional application 60/355,494, filed Feb. 8, 2002.

BACKGROUND OF THE INVENTION

The present invention relates to an airbag module, and more particularly to an attachment arrangement, which supports the airbag module upon a plurality of switches while providing primary airbag module retention.

It is well known to provide an airbag module in a vehicle at such locations as in a steering wheel, a dashboard, a seat, door panel or other location. A typical airbag module includes an airbag inflator positioned adjacent an airbag to discharge an inflator gas to inflate the airbag upon sensing certain predetermined vehicle conditions.

The airbag module is commonly formed as a separate and independent unit from the vehicle. The airbag module must be easily installed yet difficult to remove by an unauthorized person. Attachment of the airbag module is further complicated by the requirement that a horn actuator be mounted to the steering wheel assembly. Typically, the horn is triggered by pressure applied to a portion of an airbag cover.

In one known arrangement, the airbag module is rigidly anchored to a base plate within a cavity formed by the molded armature of the steering wheel assembly. A thin film actuator to activate a vehicle horn is located between the airbag module and an airbag cover. Pressure applied to the airbag cover triggers the thin film actuator to selectively actuate the horn. However, mounting of the airbag module is typically with threaded fasteners, which may complicate assembly and disassembly. Further, as the thin film actuator is mounted below the airbag cover and above the airbag module, replacement of the actuator may be complicated and time intensive should the thin film actuator fail.

In another known arrangement, a switch assembly is mounted to a base plate within a cavity formed by the molded armature. The airbag module is then mounted to the switch assembly, such that pressure applied to the airbag module moves the entire module and triggers the switch to activate the horn. The switch assembly must be particularly robust to support the airbag module yet be able to restrain the airbag module during airbag actuation. Disadvantageously, the robust design of the switch assembly results in a complicated and expensive switch assembly. A driver must also apply a relatively large amount of pressure to move the airbag module and trigger the switch. This may be rather inconvenient.

Moreover, as the switch is located under the airbag module, enough clearance must be provided to allow movement of the airbag module relative to the molded armature. Commonly, this results in a noticeable separation line or gap between the airbag module and the steering wheel assembly. The separation line may be aesthetically displeasing and may allow foreign objects to find their way between the airbag module and the steering wheel assembly. The separation line may be further exaggerated by tolerance differences between the steering wheel assembly, airbag module and biasing member within the switch assembly.

Accordingly, it is desirable to provide an uncomplicated airbag mounting arrangement, which provides effective airbag module attachment. The attachment should also allow convenient horn activation with minimal pressure. It is further desirable to minimize the separation line between the airbag module and the steering wheel assembly to provide an aesthetically pleasing steering wheel assembly.

SUMMARY OF THE INVENTION

Airbag module engagement members extend from an airbag module to engage corresponding armature engagement members. The airbag module engagement members and the armature engagement members are preferably substantially hook shaped members. The airbag module rests on the switch assemblies while engagement members are separated by a clearance unless the airbag is deployed. The clearance assures that there is not interference, which may result in undesirable noise and/or vibration.

The switch assemblies engage the airbag cover and are located proximate the steering wheel spokes and support the airbag cover which is attached to the airbag module. One embodiment of the switch assembly includes a first switch portion movable relative to a second switch portion. The first switch portion includes a first switch engagement member of a substantially hook shaped member which engages the airbag cover. The second switch portion includes a second switch engagement member, which fits within the.apertures formed within the molded armature. The switch assembly may thereby be "snapped" into the molded armature.

A biasing member such as a pair of coil springs mounted between the first switch portion and the second switch portion bias the first switch portion relative to the second switch portion. The airbag cover and the connected airbag module rest upon the switch assemblies.

Another embodiment of a switch assembly includes a first switch portion movable relative to a second switch portion while being biased by a single biasing member.

Another embodiment provides a flexible electrical connection casing that extends between a plurality of switch assemblies. A multiple of switch assemblies are molded as a single unit and connected to the vehicle horn circuit at a single connector.

Yet another embodiment of a switch assembly includes a first switch portion movable relative to a second switch portion while being biased by a biasing member. The biasing member includes a flexible spring plate, which also forms an integral first contact. The first contact is movable relative to a second contact mounted in the second switch portion. Still another embodiment of a switch assembly includes a first switch portion formed directly into the airbag cover. An uncomplicated and reliable switch assembly is thereby provided.

The present invention therefore provides an uncomplicated yet secure airbag mounting arrangement, which provides effective airbag module attachment.

BRIEF DESCRIPTION OF THE DRAWINGS

The features of the present invention, which are believed to be novel, are set forth with particularity in the appended claims. The invention may be better understood by reference to the following description of the specific embodiments taken in conjunction with the accompanying drawings in which:

FIG. 3C is an exploded top view of the steering wheel assembly.

FIG. 8A is a rear perspective view illustrating another switch assembly according to the present invention.

DETAILED DESCRIPTION OF THE INVENTION

Figure 1:
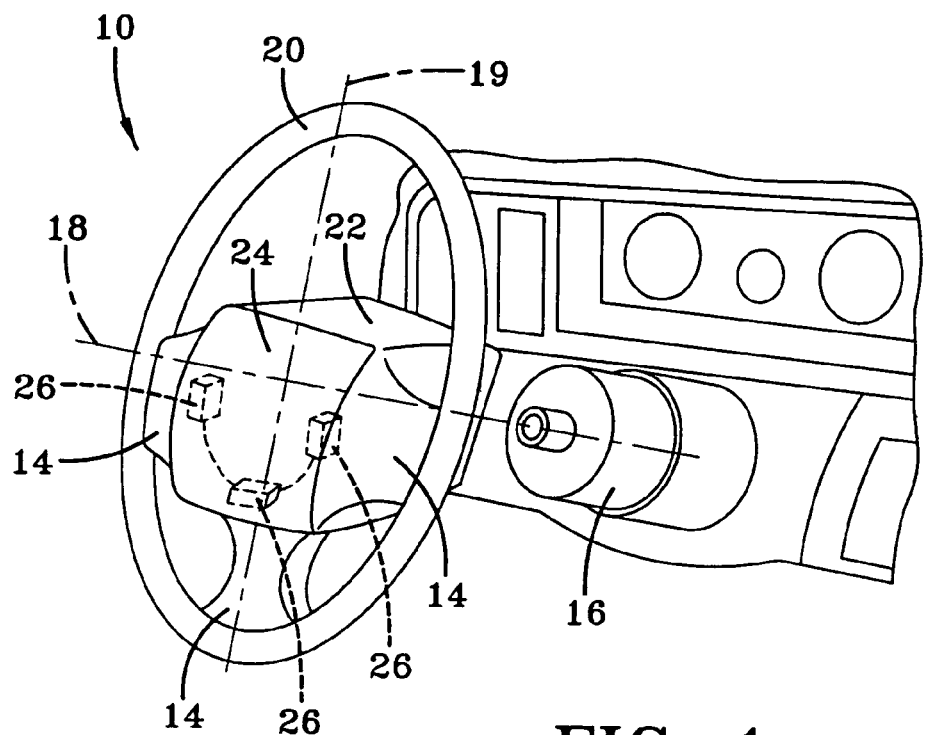
FIG. 1 is a general perspective view of a vehicle steering wheel assembly installed in a vehicle.

FIG. 1 illustrates a vehicle steering wheel assembly 10 positioned next to the steering column 16. The steering wheel assembly 10 includes a central hub portion 12 (FIG. 2A) with outwardly extending spokes 14. The hub portion 12 has an axis 18 substantially perpendicular to the hub portion 12 and coaxial to the steering column 16. An essentially circular rim 20 is connected to the hub portion 12 by the spokes 14. The spokes 14 are preferably arranged from the central hub portion 12 to the rim 20 at 90, 180 and 270-degree positions. In other words, the spokes 14 are arranged at 3, 6, and 9 o'clock positions where 12 o'clock is the top of the rim 20 when viewed from the driver's position. One skilled in the art appreciates that the steering wheel assembly 10 could have any number of spokes and the spokes could be arranged in different positions.

Figure 2:
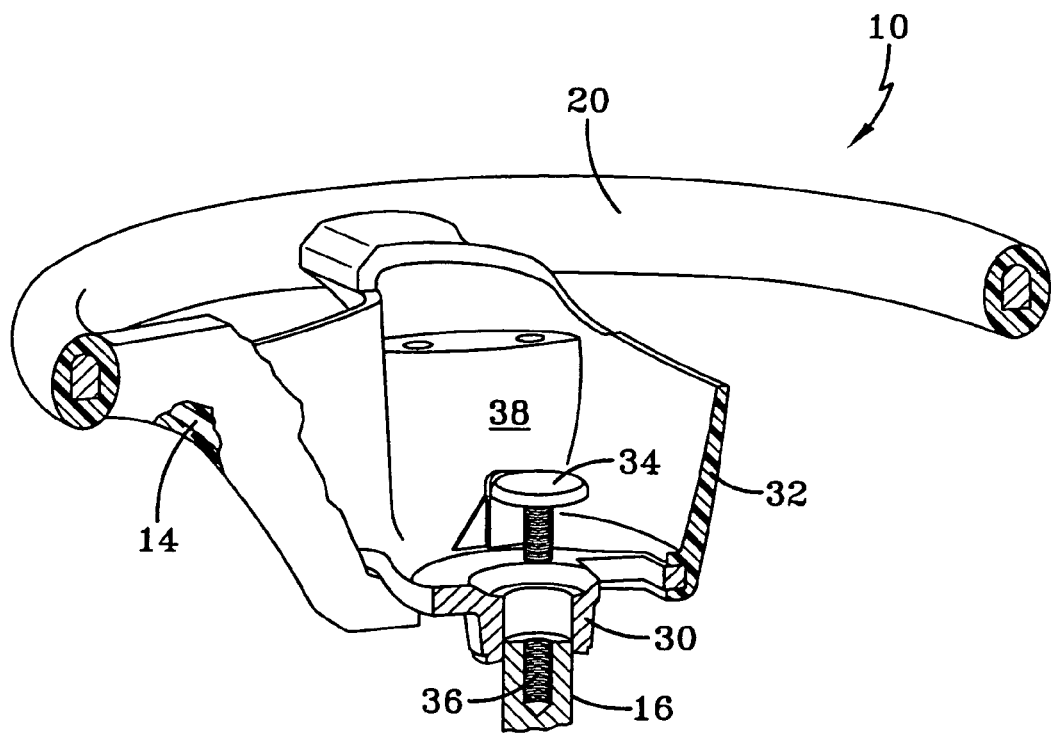
FIG. 2 is a partial sectional exploded view of a molded armature and steering column.

Referring to FIG. 2, the steering wheel assembly 10 includes a metallic steering wheel armature 30, which is overmolded with a non-metallic material 32 such as polyurethane material or the like to form what is referred to as a "molded armature". The hub portion 12 is preferably secured to the steering column 16 by a threaded fastener 34 such as a bolt or the like. The fastener 34 engages corresponding threads 36 within the steering column 16. One skilled in the art appreciates that other fastening arrangements are suitable for the present invention. The non-metallic material 32 defines the essentially circular rim 20 and spokes 14 about the hub portion 12 and forms a cavity 38 to receive the airbag module 22.

Figure 3:
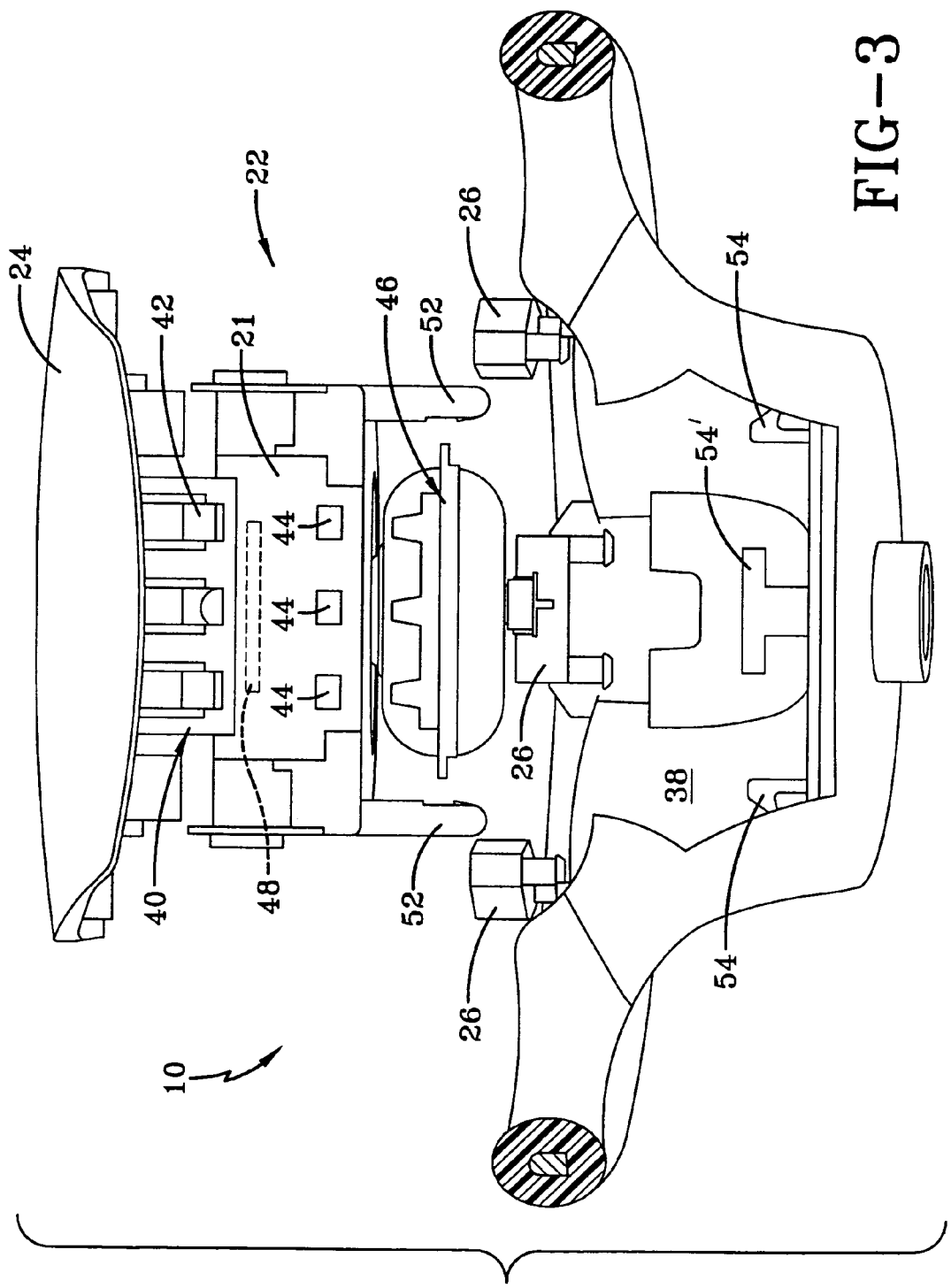
FIG. 3 is an exploded view of a steering wheel assembly according to the present invention.

Referring to FIG. 3, an exploded view of the steering wheel assembly 10 is illustrated. The airbag module 22 is mountable within the cavity 38 and concealed by the airbag cover 24. When a driver exerts pressure on the airbag cover 24, at least one switch assembly 26 is closed. Each switch assembly 26 activates a horn (not shown) in a known manner. As the switch assemblies 26 are preferably located proximate the airbag cover 24, minimum pressure is required to activate the horn. Although a particular steering wheel assembly 10 having a particular spoke hub and rim design is illustrated in the disclosed embodiment, it should be realized that other steering wheel assemblies will benefit from the present invention.

As shown in FIG. 3, the airbag cover 24 includes attachment members 40, which fixedly engage an airbag housing 21. The attachment members 40 include apertures 42, which receive corresponding tabs 44 (FIG. 3D) extending from the airbag housing 21. It is understood that the airbag cover 24 can be attached the airbag housing by other arrangements. An inflator 46 is located within the cavity 38 and provides inflation gas to an airbag 48 during a car crash. An electrical connector 50 (FIG. 3A) extends from the inflator 46 and is connectable to an airbag firing circuit (illustrated schematically at 51).

Airbag module engagement members 52 (illustrated in FIG. 3D) extend from the airbag housing 21. armature engagement members 54 (illustrated in FIG. 3B) corresponding to the airbag module engagement members 52 extend from the hub portion 12 of the armature. Preferably, the airbag module engagement members 52 and the armature engagement members 54 are substantially hook shaped members (FIG. 3). As will be further described below, the airbag module 22 rests on the switch assemblies 26 while engagement members 52, 54 are normally separated by a clearance C (FIG. 3E) and are only in contact, if the airbag 48 is deployed.

Figure 3A:
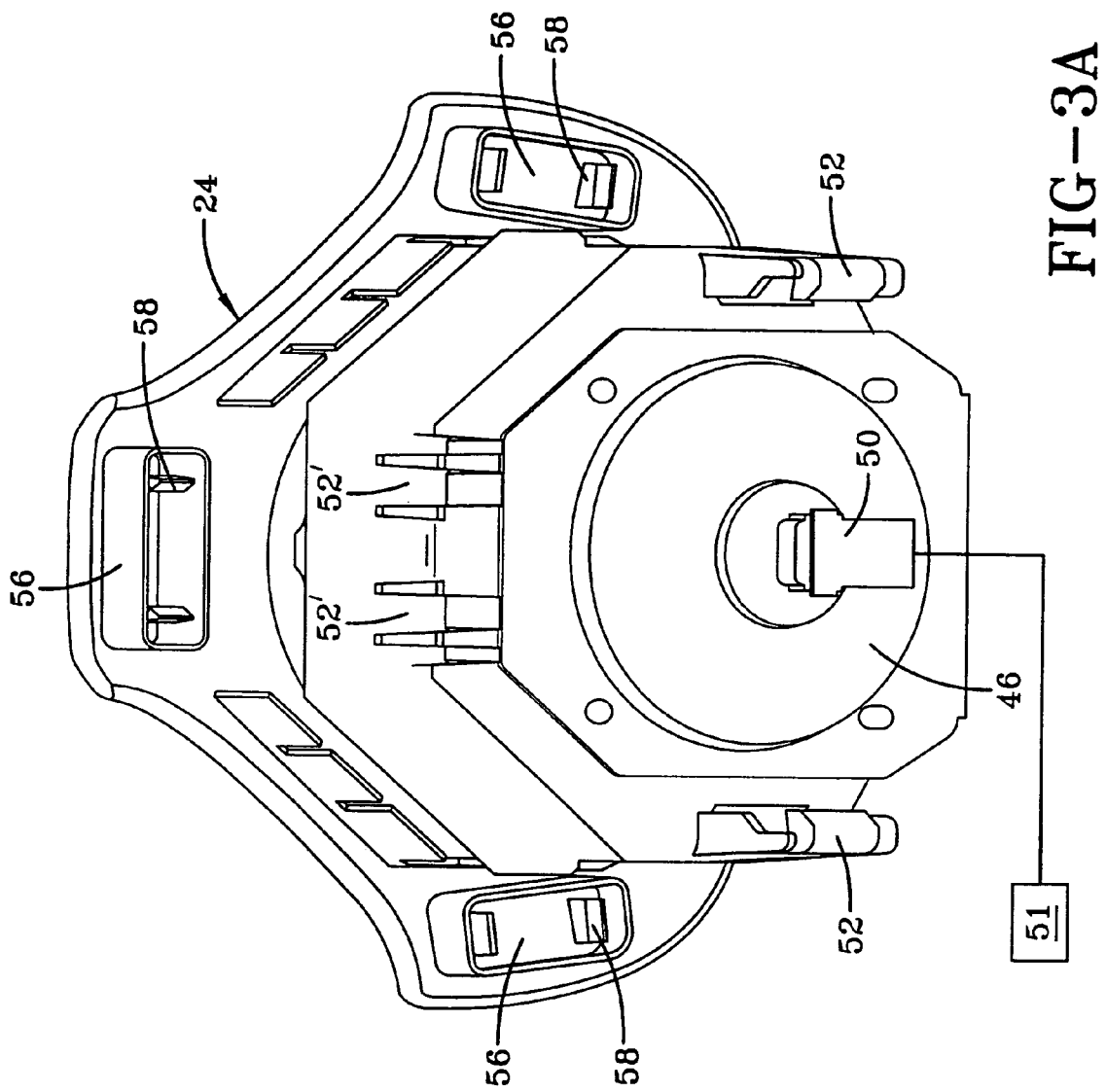
FIG. 3A is a bottom view of an airbag module illustrated in FIG. 3.
Figure 3B:
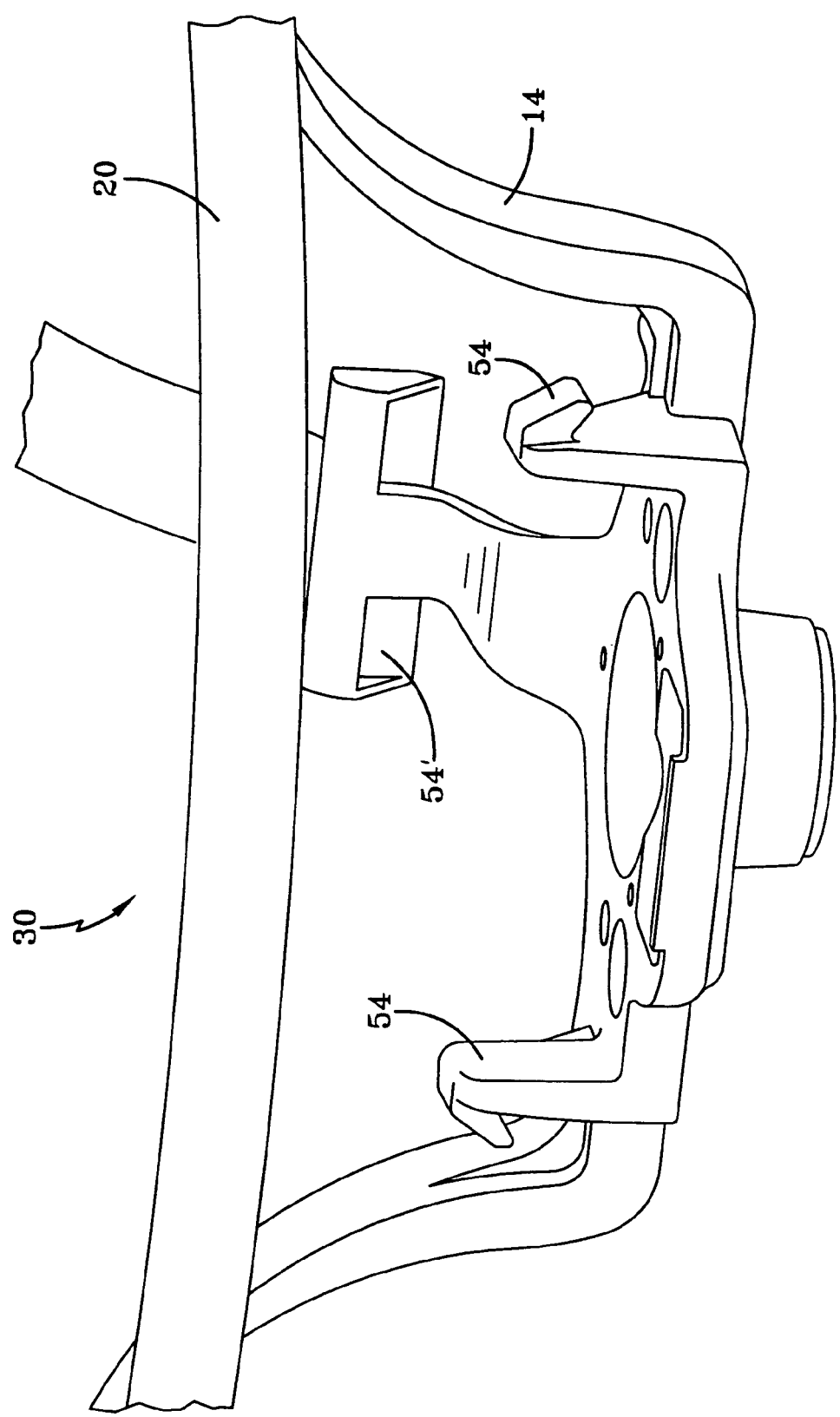
FIG. 3B is a perspective view of the steering wheel armature illustrating a multiple of hook engagement members.
Figure 3D:
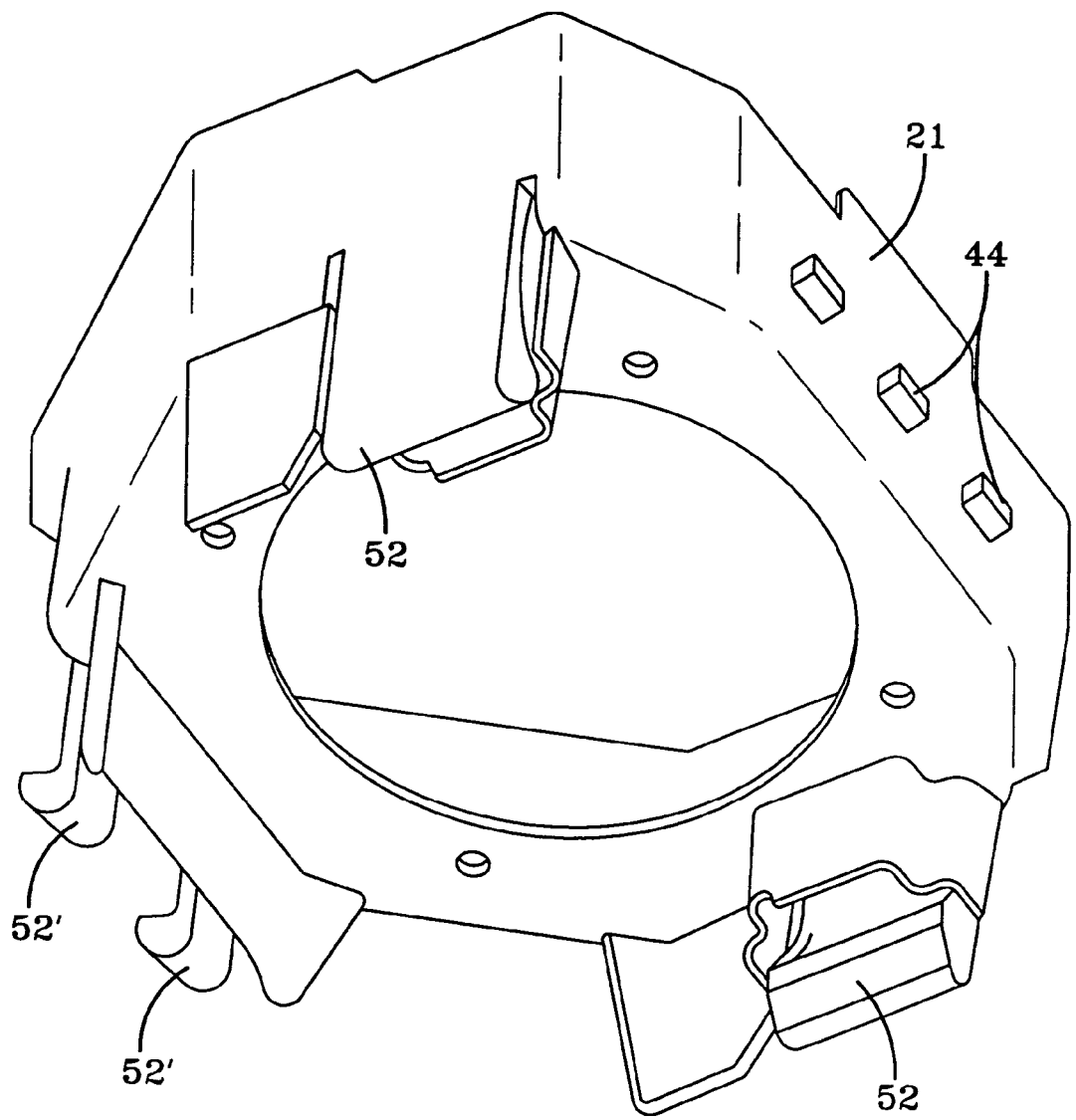
FIG. 3D is a perspective of an airbag housing illustrated in FIG. 3 showing multiple engagement members for fastening the airbag housing to the molded armature.

Referring to FIG. 3A, the airbag cover 24 includes a plurality of switch assembly receivers 56. The receivers 56 each include an airbag cover engagement member 58 such as a substantially hook shaped engagement member to engage the switch assemblies 26 (FIG. 4).

Referring to FIG. 3C, the switch assemblies 26 are preferably located proximate each spoke 14 and support the airbag cover 24. The switch assemblies 26 are mounted within apertures 60 formed within the molded armature 32. The airbag cover 24 is mounted to the airbag module 22 and is mounted in a close fitting relationship with the molded armature 32. The switch assemblies 26 directly engage the airbag cover 24 receivers 56 (FIG. 3A) which are located proximate the spokes 14. The component tolerance stack up is thereby minimized. Moreover, an aesthetically pleasing fit between the airbag cover 24 and the molded armature 32 is provided which minimizes any separation line while still allowing horn activation by allowing movement of the airbag cover 24 relative to the molded armature 32.

Figure 4:
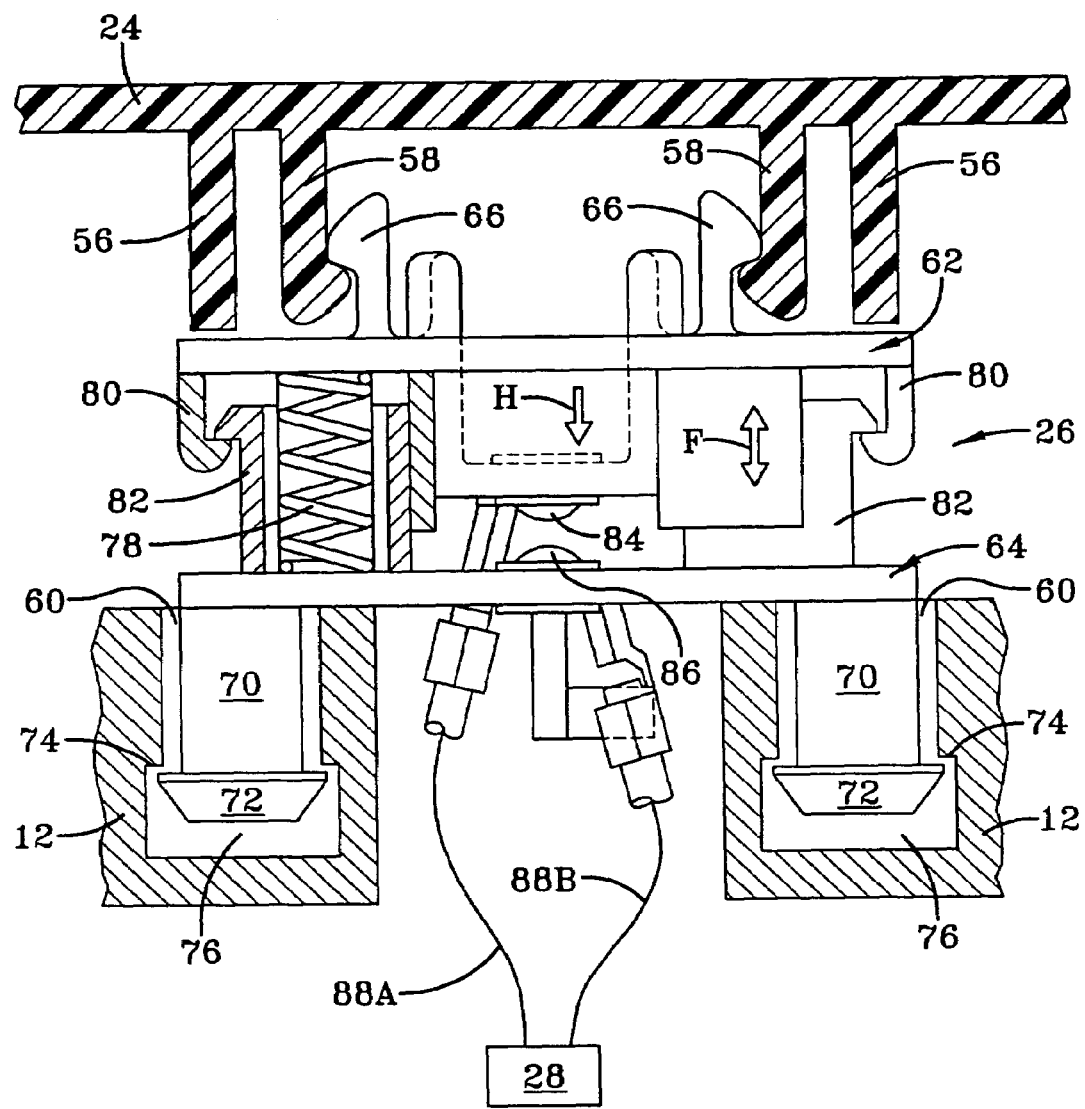
FIG. 4 is a partial sectional view illustrating a switch assembly according to the present invention.

Referring to FIG. 4, one embodiment of a switch assembly 26 is illustrated in a mounted position. The switch assembly includes a first switch portion 62 movable relative to a second switch portion 64. The first switch portion 62 includes a first switch engagement member 66 preferably including a substantially hook shaped member which engages the switch assembly receiver 56 having corresponding engagement members 58. The airbag module 22 is "snapped" onto the first switch portion 62. However, other mounting arrangements may alternatively or additionally be provided.

The second switch portion 64 includes engagement members 70, which fit within the apertures 60 formed in the molded armature 32. The second switch engagement member 70 is preferably of a substantially cylindrical design having a ramped locking shoulder 72, which is engageable with a shoulder 74 formed by an enlarged diameter 76 within the aperture 60. The switch assembly 26 is also preferably "snapped" into the molded armature 32.

A biasing member 78 mounted between the first switch portion 62 and the second switch portion 64 biases the first switch portion 62 relative to the second switch portion 64. In the embodiment of FIG. 4, the biasing member 78 is a coil spring which forces (illustrated as double headed arrow F) the first switch portion 62 away from the second switch portion 64. The switch assemblies 26 support the airbag cover 24 and the connected airbag module 22.

The first switch portion 62 further includes a first hook 80 and the second switch portion 64 includes a second hook 82. The hooks 80,82 interact under the force of the biasing member 78, to limit movement of the first switch portion 62 relative to the second switch portion 64. Although the hooks 80,82 are illustrated as corresponding hook shaped members in the disclosed embodiment, it should be understood that other hooks which limit relative movement of the switch portions 62,64 may additionally or alternatively be provided.

A first contact 84 mounted to the first switch portion 62 is thereby movable relative to a second contact 86 mounted on the second switch portion 64. By pressing on the airbag cover 24, the first switch portion 62 is moved in the direction of arrow H toward the second switch portion 64 such that the first contact 84 will touch the second contact 86. A circuit (illustrated by electrical connectors 88a and 88b) is closed and the horn 28 is activated.

A method for installing the above mentioned airbag module 22 within a molded armature 32 will now be described. However, it should be realized that the use of a steering wheel is for illustrative purposes only, and that the methodology of the present invention may be applied to other components.

Figure 2A:
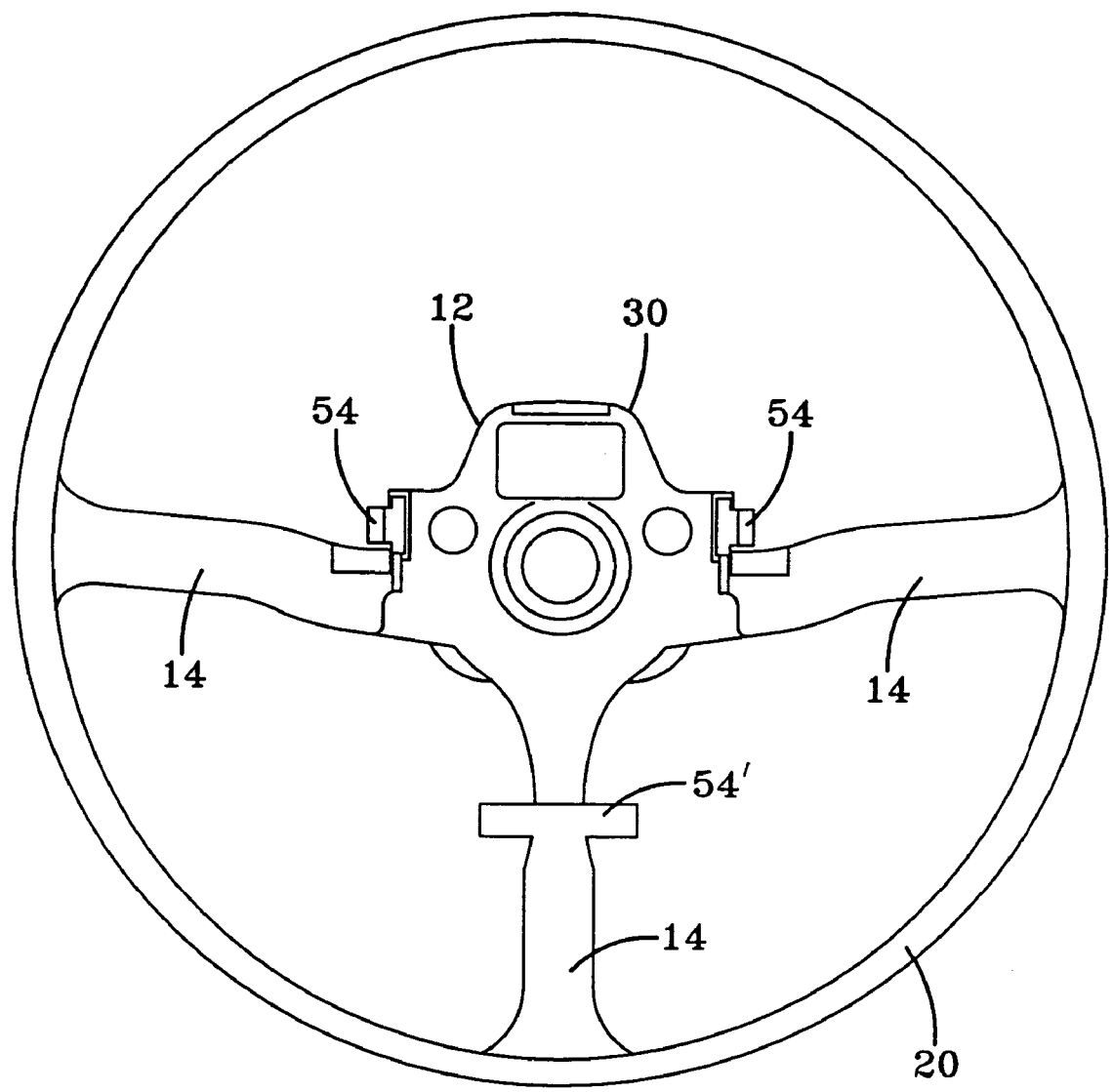
FIG. 2A is a top view of a steering wheel armature illustrating a multiple of hook engagement members located at 3, 6 and 9 o'clock positions.
Figure 5A:
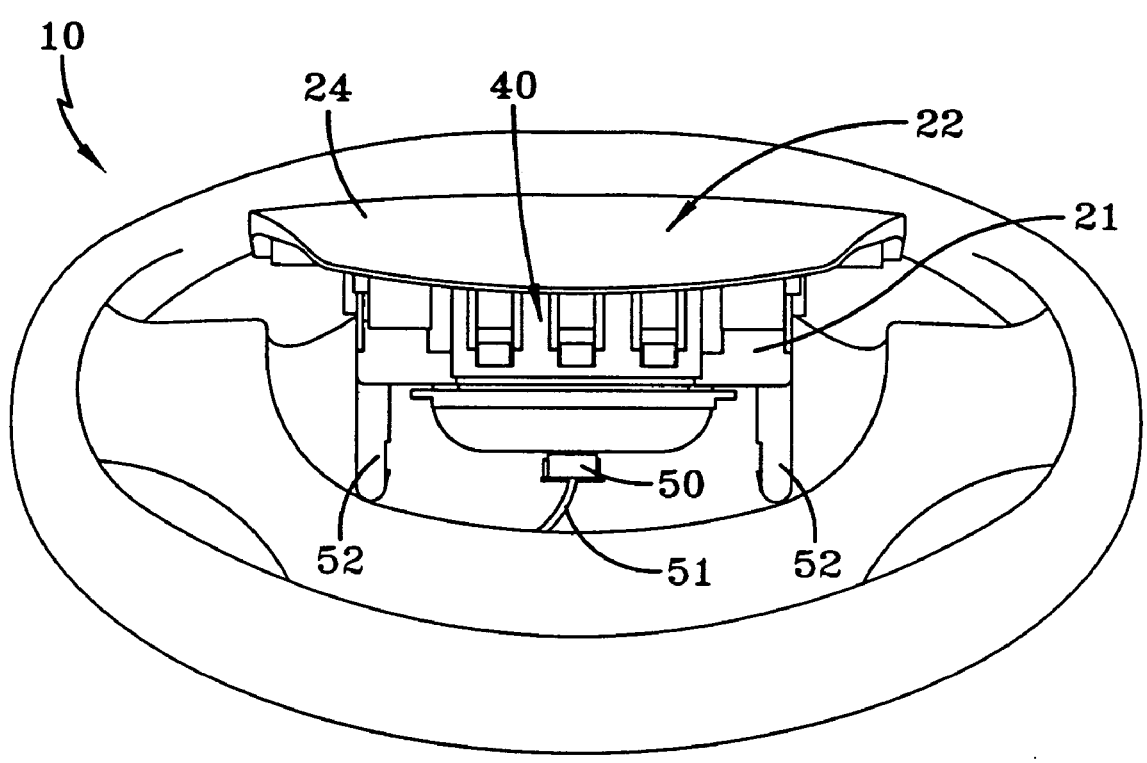
FIG. 5A is a perspective view illustrating a step of mounting the airbag module to the steering wheel armature.

Referring to FIG. 5A, the molded armature 32 is first secured to the steering column 16 by the threaded fastener 34 (FIG. 2). The switch assemblies 26 are then mounted within the apertures 60 formed within the molded armature 32. The switch assemblies 26 preferably just "snap" into place (FIG. 2A). A wiring harness (88A and 88B) for the horn is then connected to the switch assemblies 26.

Referring to FIG. 5A, the airbag cover 24 has been previously attached to the airbag housing 21 with the attachment member 40 to form the airbag module 22. The electrical connector 50 of the inflator 46 is connected to the airbag firing circuit 51 (also illustrated in FIG. 3A). The airbag module 22 is then located within the cavity 38 of the molded armature.

Figure 3E:
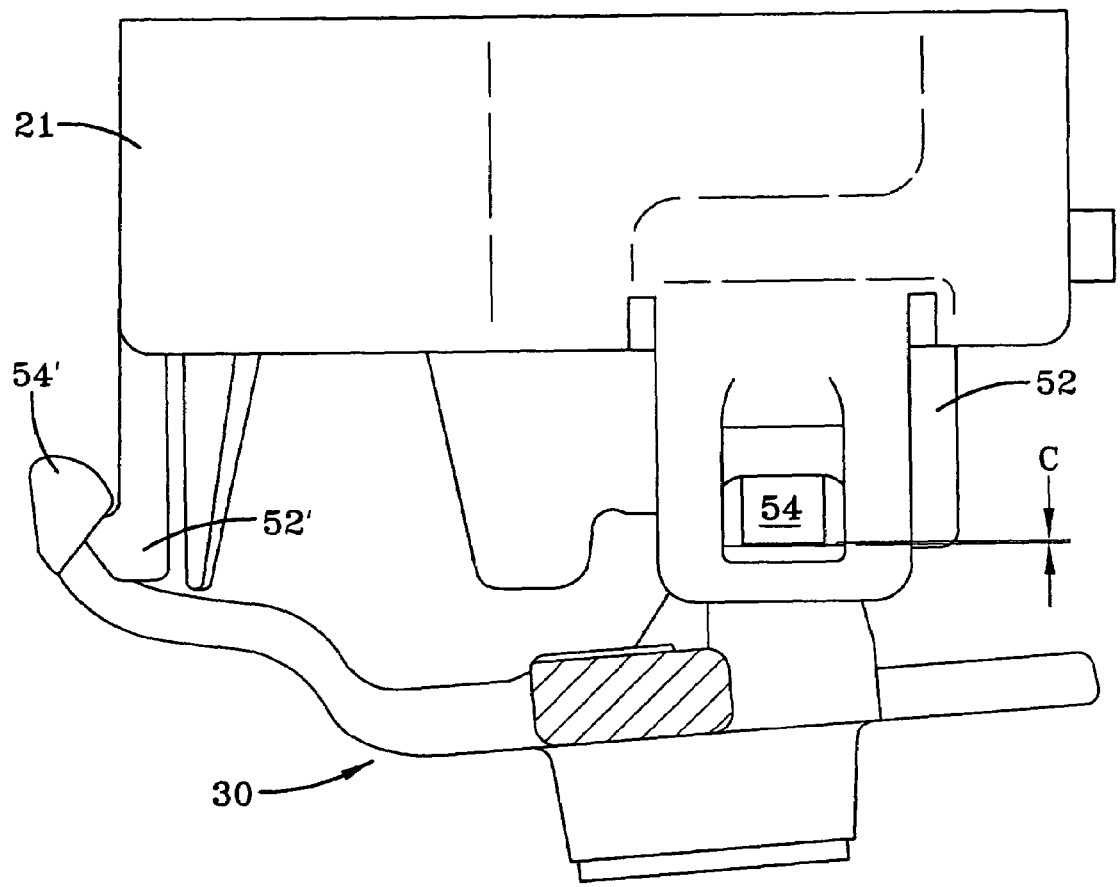
FIG. 3E is a perspective view of the airbag housing illustrated in FIG. 3 D attached to the steering wheel armature shown in FIG. 3B.

Preferably, the airbag module engagement member 52' located at the 6 o'clock position is first aligned with the armature engagement member 54' located at the 6 o'clock position (FIG. 3E). The airbag module 22 is tipped toward the armature engagement member 54', preferably at approximately 10 degrees below axis 19 (FIG. 1). Axis 19 is perpendicular to axis 18. The airbag module engagement member 52' is engaged with the corresponding armature engagement member 54' and the switch assembly 26 located at the 6 o'clock position is aligned with the switch assembly receiver 56 within the airbag cover 24 (FIG. 3E). The airbag module 22 is then tipped toward axis 19 such that all of the first switch engagement members 66 are aligned with their corresponding airbag cover engagement members 58.

The operator then simply presses against on the airbag cover 24 proximate the spokes 14 within the airbag cover 24 until each first switch engagement member 66 engages their corresponding airbag cover engagement members 58 within the airbag cover 24. The armature engagement members 54 and the airbag module engagement members 52 are also engaged at this time. In other words, the airbag module 22 is "snapped" onto the switch assemblies 26 which have been previously "snapped" into the molded armature 32. An uncomplicated yet secure attachment arrangement is thereby provided by the present invention.

Figure 5B:
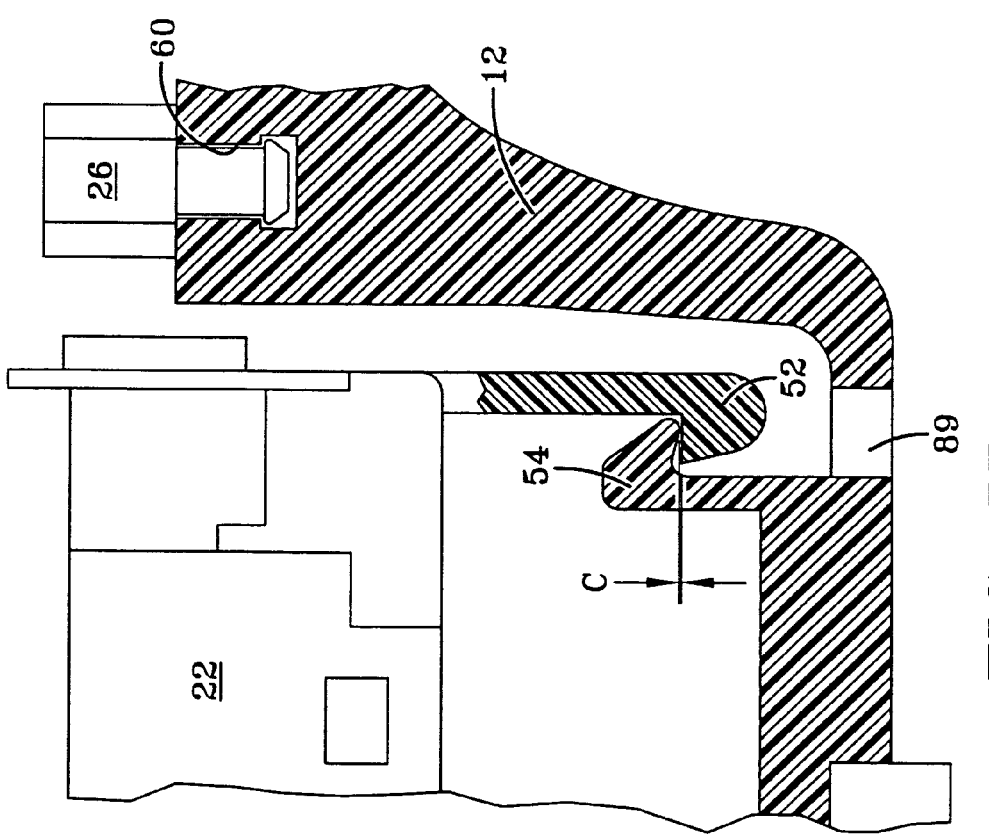
FIG. 5B is a sectional view from the 6 o'clock position of a steering wheel assembly showing the airbag module mounted to the steering wheel armature.

Referring to FIG. 5B, a clearance C is formed between each armature engagement members 54 and the corresponding airbag module engagement members 52 when the module 22 is mounted to the molded armature 32. The module 22 thus rests on the switch assembly 26. Preferably, the clearance C is approximately 1 mm. The clearance C assures that there is normally no interference between each armature engagement member 54 and the corresponding airbag module engagement members 52 which may result in undesirable noise and or vibration.

To activate the horn (FIG. 1), a driver need only press on the airbag cover 24 and overcome the biasing members 78 such that the first contact 84 touches the second contact 86 (FIG. 4). It should be understood that when the driver presses on the airbag cover 24, the clearance C will slightly increase. Although there is normally a clearance C, the clearance C will be eliminated during deployment of the airbag. In other words, when the airbag is fired, each armature engagement member 54 will engage each corresponding airbag module engagement member 52 to provide a rigid attachment between the airbag module 22 and the molded armature 32. In this way, the switch assemblies 26 need not provide airbag module retention during airbag deployment.

Figure 6A:
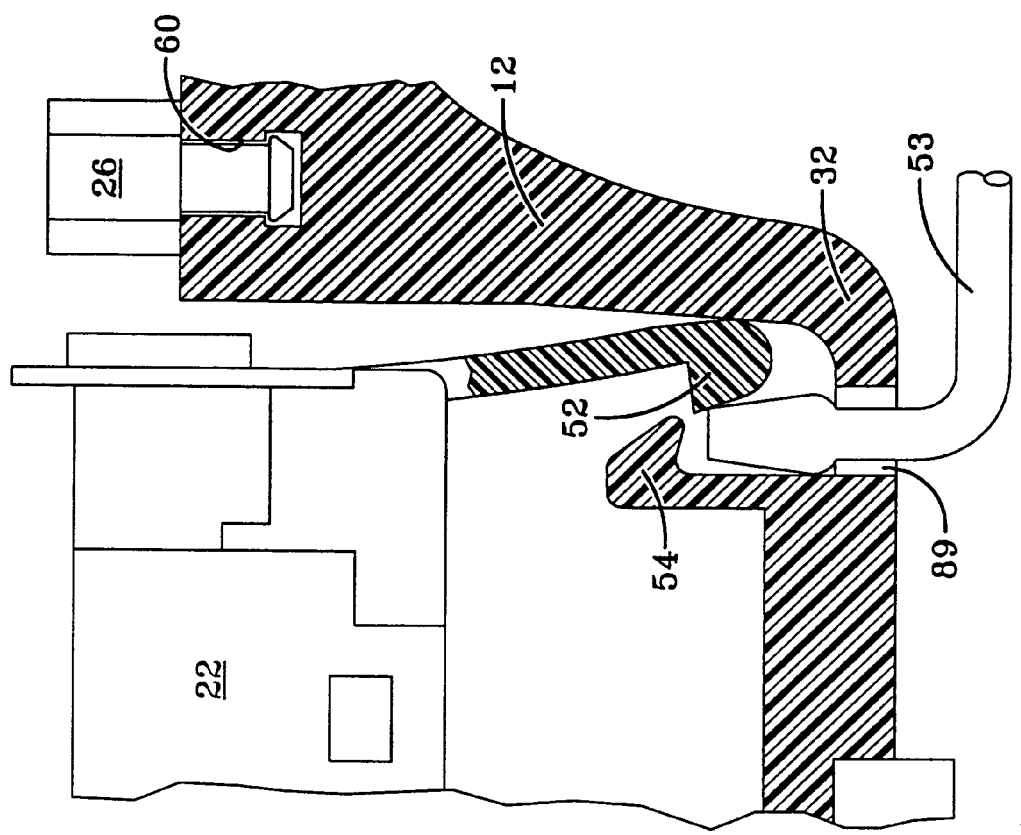
FIG. 6A is a sectional view at the 3'oclock position illustrating the disassembly aperture of FIG. 6 and engagement members accessed thereby.
Figure 6:
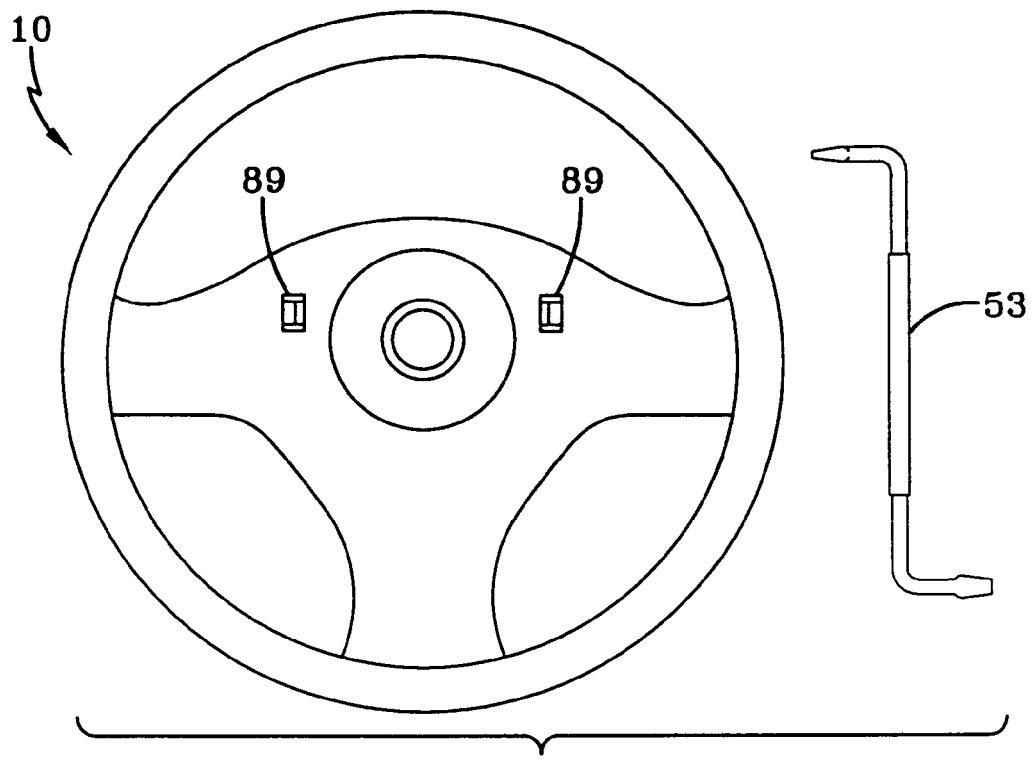
FIG. 6 is a bottom view of the steering wheel armature illustrating disassembly apertures and also disassembly tool.

Referring to FIG. 6, a disassembly aperture 89 is located through the armature 30 preferably adjacent the 3 o'clock and 9 o'clock armature engagement member 54 (FIG. 2A). To provide an additional anti-theft feature, the disassembly apertures 89 may be located relative to the steering column 16 (FIG. 1) and under the steering wheel assembly 10 such that the steering wheel assembly 10 must be rotated to a predefined position to access the apertures 89.

Figure 6B:
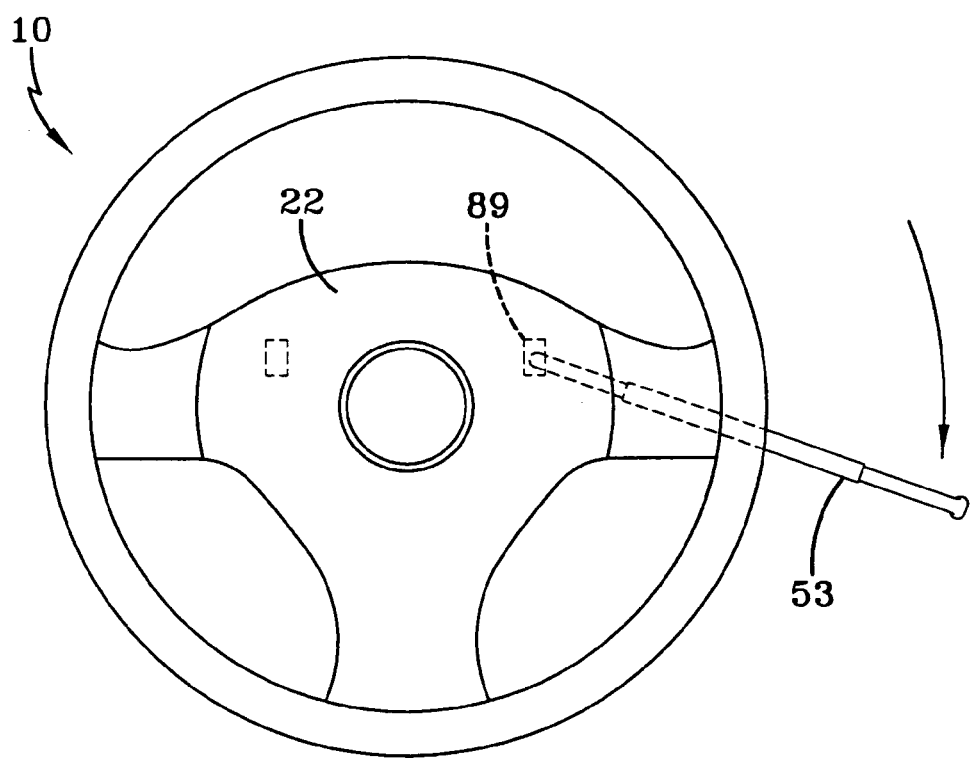
FIG. 6B is a bottom view illustrating a step of disassembling the airbag module from the molded armature.

Referring to FIG. 6A, a sectional view of the steering wheel assembly 10 illustrates a method of disassembly. A flat bladed disassembly tool 53 is receivable through the disassembly aperture 89 (FIG. 6B). The tool 53 is inserted between the armature engagement member 54 and the corresponding airbag module engagement member 52. The tool 53 is then rotated to spread the airbag module engagement member 52 away from the armature engagement member 54. The module 22 is then lifted to assure disengagement between the armature engagement member 54 and corresponding airbag module engagement member 52. The tool 53 can then be inserted into the other disassembly apertures 89 and the process repeated. The airbag module 22 is tilted and lifted away from the molded armature 32 to disassemble the steering wheel assembly 10 in the reverse order of assembly as described above.

Figure 7:
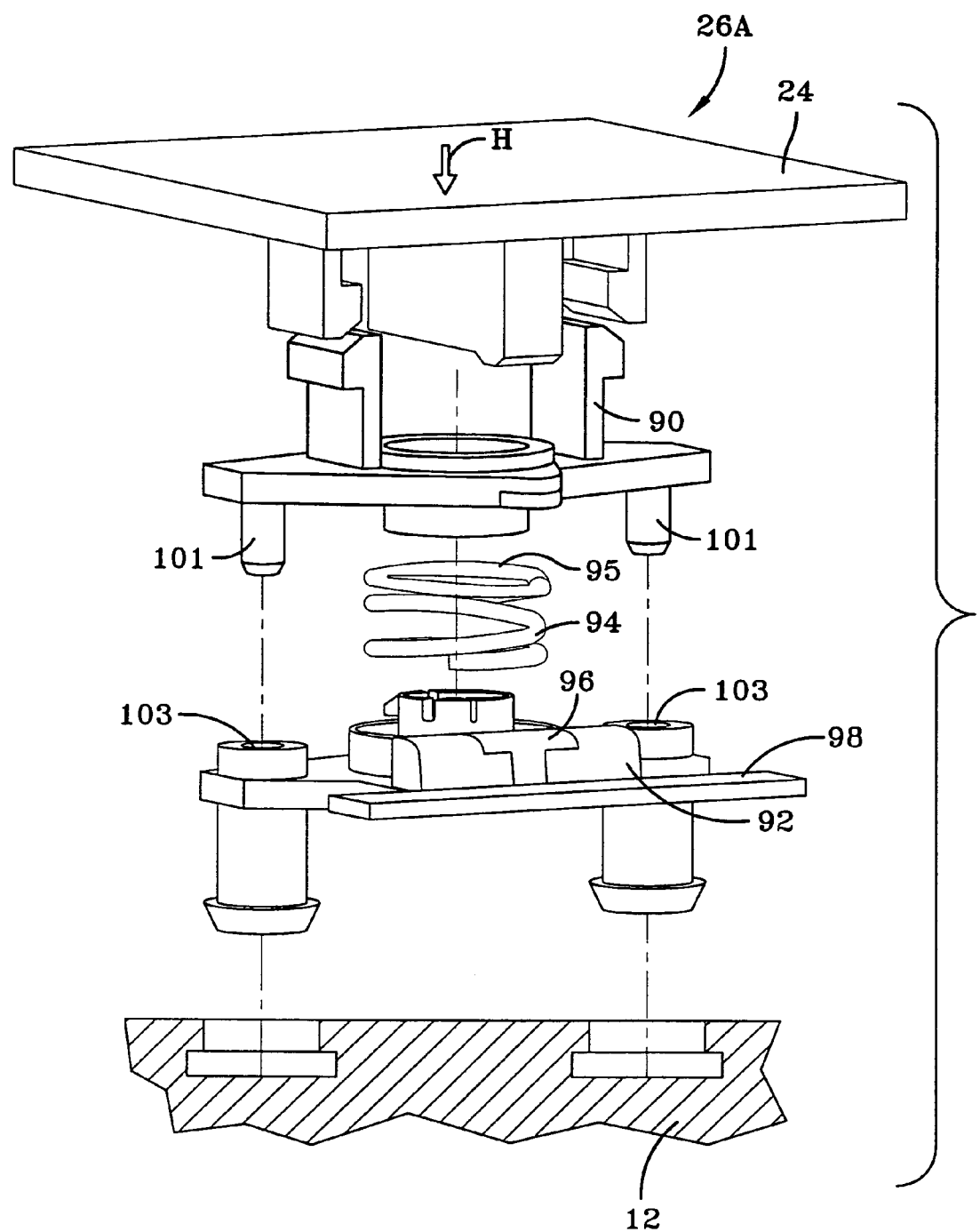
FIG. 7 is an exploded view illustrating another switch assembly according to the present invention.

Referring to FIG. 7, another embodiment of a switch assembly 26A is illustrated. The switch assembly 26A includes a first switch portion 90 movable relative to a second switch portion 92 while being biased by a single biasing member 94. The first switch portion 90 and second switch portion 92 are engaged together and mounted to the airbag cover 24 and the molded armature 32 essentially as described above.

A first contact 95 mounted to the first switch portion 90 is movable relative to a second contact 96 mounted on the second switch portion 92. By pressing on the airbag cover 24, the first switch portion 90 is moved in the direction of arrow H toward the second switch portion 92 such that the first contact 95 will touch the second contact 96. A pair of alignment pins 101 further extend from the first switch portion 90. The pins 101 are movable received within alignment apertures 103 formed in the second switch portion 92. The alignment pins 101 and alignment apertures 103 further assure that the airbag cover is stabilized and pressure thereon will be more directly exerted upon the switch assembly 26a. A flexible casing 98 extends from the second switch portion 92 such that a plurality of switch assemblies 26 can be molded as a single unit (FIG. 7B) with a single circuit connection.

Figure 7A:
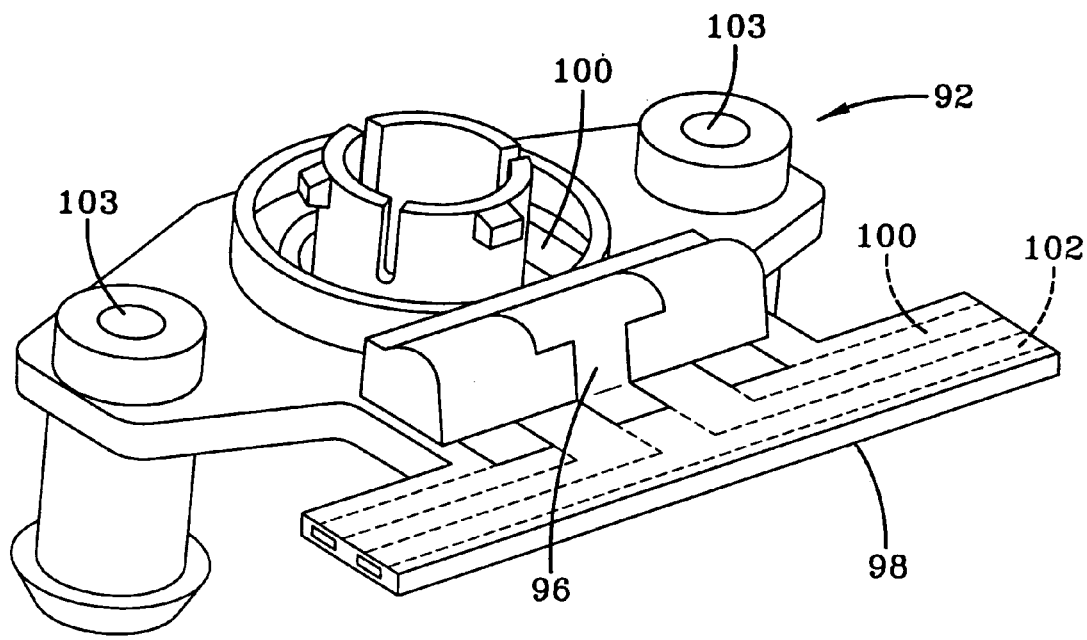
FIG. 7A is a perspective view of a second switch portion of the switch assembly illustrated in FIG. 7 illustrating a switch contact arrangement.
Figure 7B:
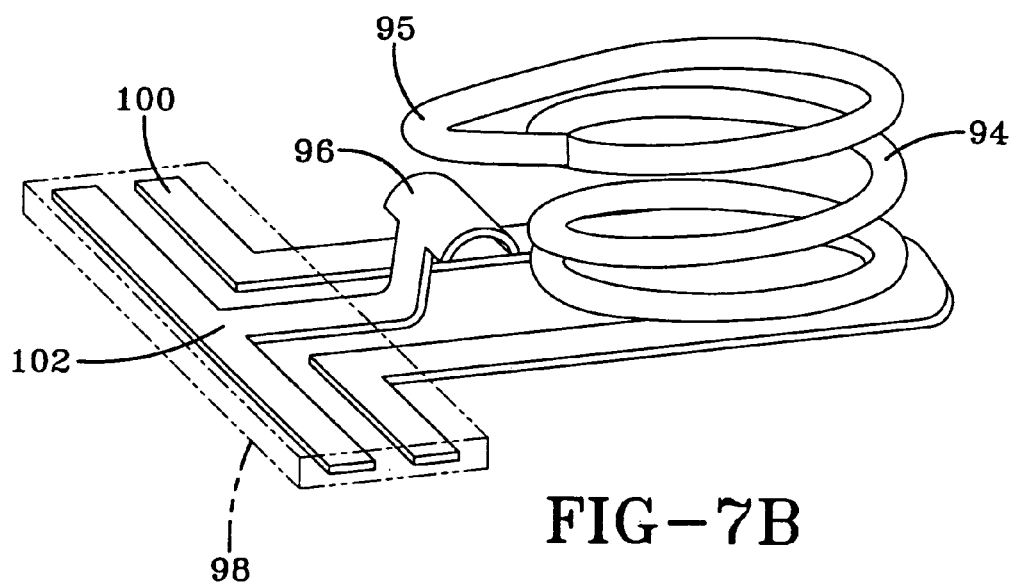
FIG. 7B is a perspective view of the first and second contacts portions of the switch assembly in FIG. 7.

The first contact 95 is integral to the coil spring which forms the biasing number 94 as illustrated in FIGS. 7, 7A and 7B. Installation is thereby simplified as a multiple of switch assemblies can be installed and connected in parallel, although only a single connection need be made. Referring to FIG. 7A the flexible casing 98 includes a first electrical connection 100, which is electrically connected to the first contact 95 through the biasing member 94. The flexible casing 98 further contains a second electrical connection 102, which is insulated from the first connection 100 by the flexible casing 98. The second electrical connection 102 is electrically connected to the second contact 96 mounted on the second switch portion 92.

By pressing on the airbag cover 24 (FIG. 7), the first switch portion 90 is moved in the direction of arrow H such that a circuit is closed and the horn 28 is activated. Referring to FIG. 7B, the closed circuit is formed from the first electrical connection 100, through the biasing member 94, to the first contact 95, to the second contact 96 and back to the second electrical connection 102.

Referring to FIG. 8A, another embodiment of a switch assembly 26B is illustrated. The switch assembly 26B includes a first switch portion 104 movable relative to a second switch portion 106 while being biased by a biasing member 108. A fastener 105 extends from the biasing member 108 to mount the biasing member 108 to the second switch portion 106. A guide pin 107 which extends from the first switch portion 104 is preferably movable within the fastener 105 such that the first switch portion 104 is movable relative to the second switch portion 106. It should be understood that although a particular mounting arrangement is illustrated other mounting arrangements are contemplated which provide engagement of the biasing member 108 and relative movement between the first and second switch portions 104,106. The switch assembly 26B is mounted to the airbag cover 24 and the molded armature 32 essentially as described above.

Figure 8B:
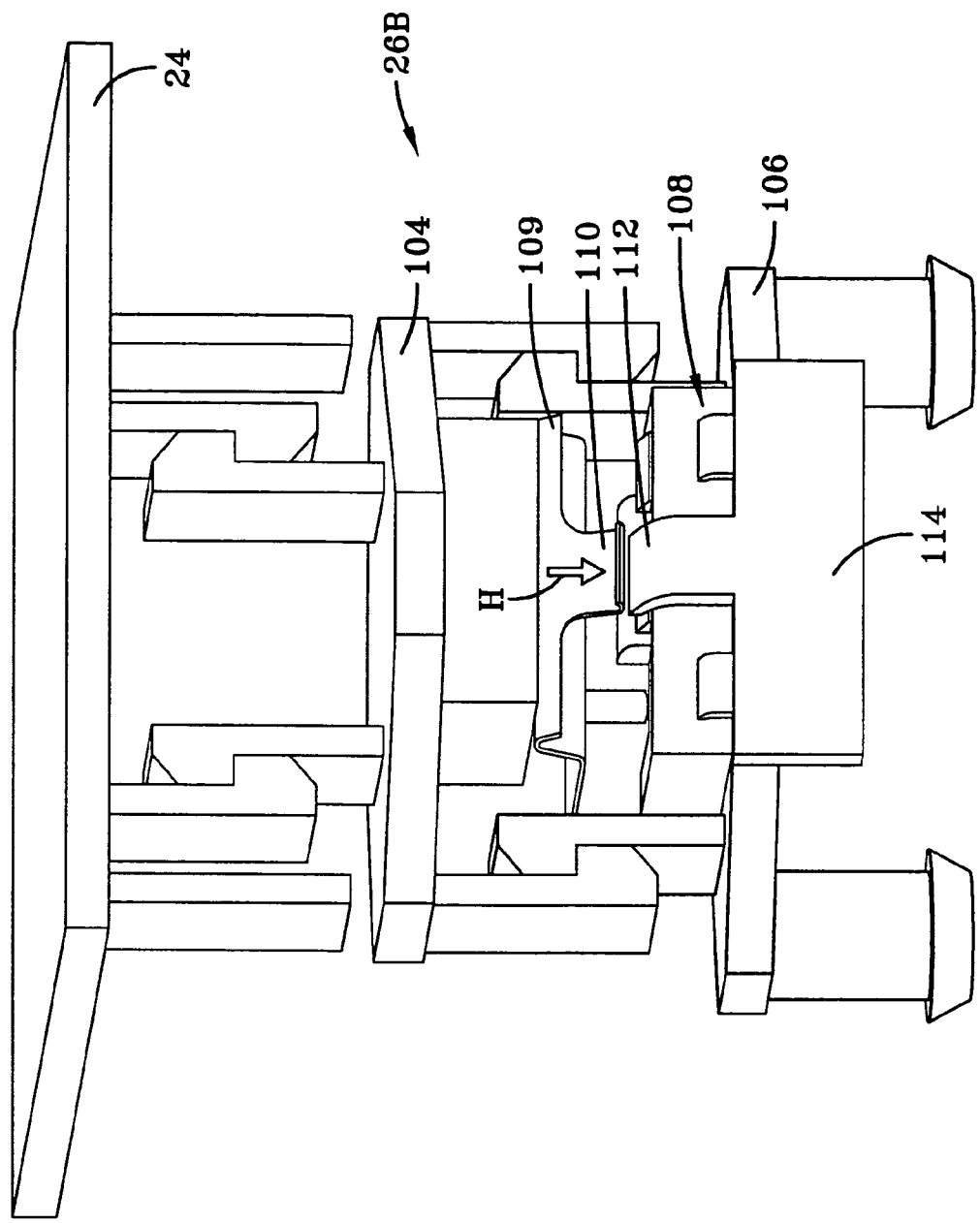
FIG. 8B is a front perspective view of the switch assembly illustrated in FIG. 8A.

Referring to FIG. 8B, the biasing member 108 includes a flexible spring plate 109 which also forms an integral first contact 110. The first contact 110 is movable relative to a second contact 112 mounted in the second switch portion 106. The biasing member 108 includes a flexible casing 114 as described above. By pressing on the airbag cover 24, the first switch portion 104 overcomes the bias of spring plate 109 such that the integral first contact 110 is moved in the direction of arrow H to touch the second contact 112 and close the circuit, whereby activating the horn.

Figure 9A:
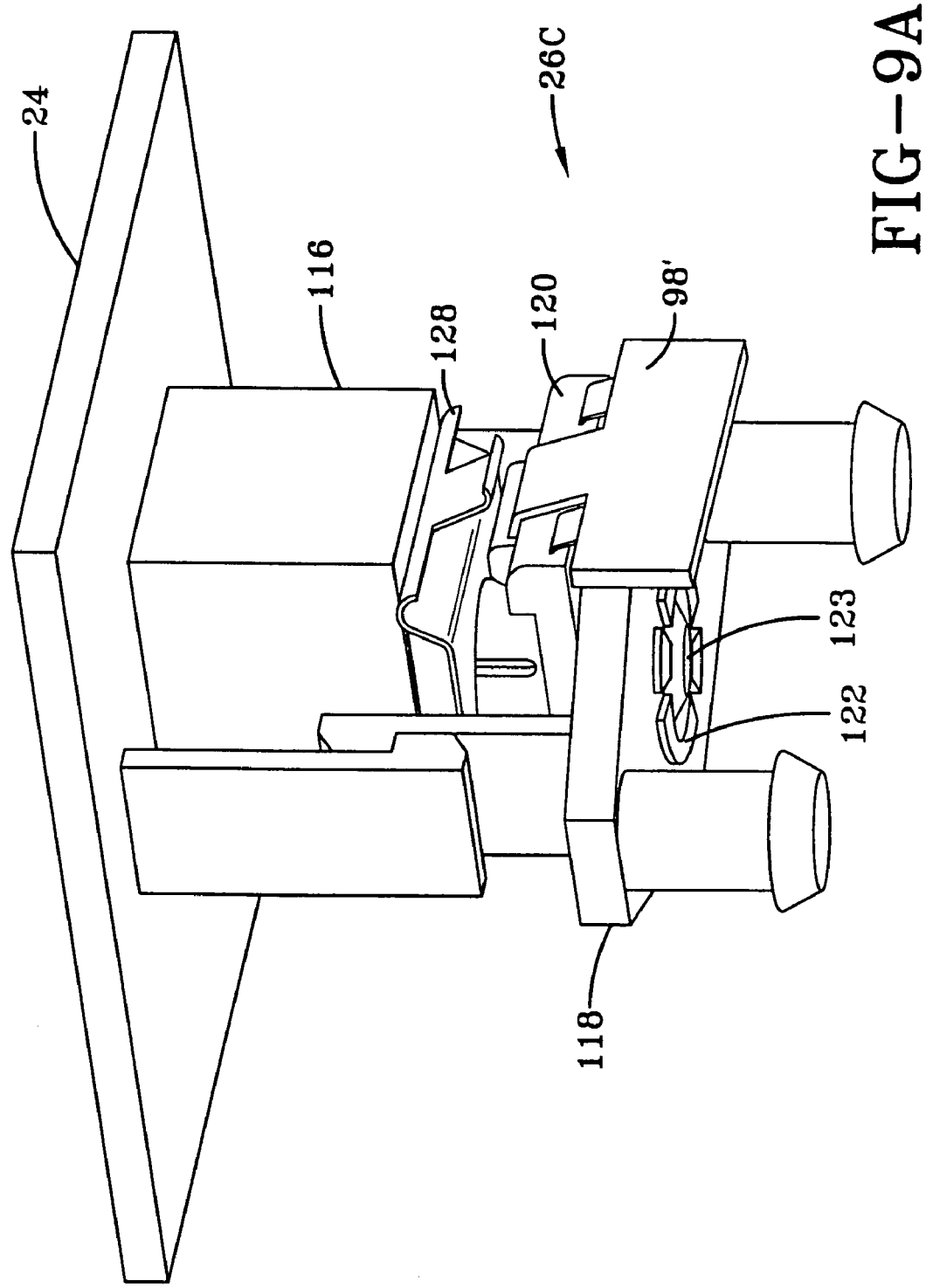
FIG. 9A is a perspective view illustrating another switch assembly having two portions.

Referring to FIG. 9A, another embodiment of a switch assembly 26C is illustrated. The switch assembly 26c includes a first switch portion 116 formed into the airbag cover 24 to further minimize part count and complexity. A second switch portion 118 mounts a biasing member 120, essentially as described above. A fastener 122 extends from the biasing member 120 to mount the biasing member 120 to the second switch portion 118.

Figure 9B:
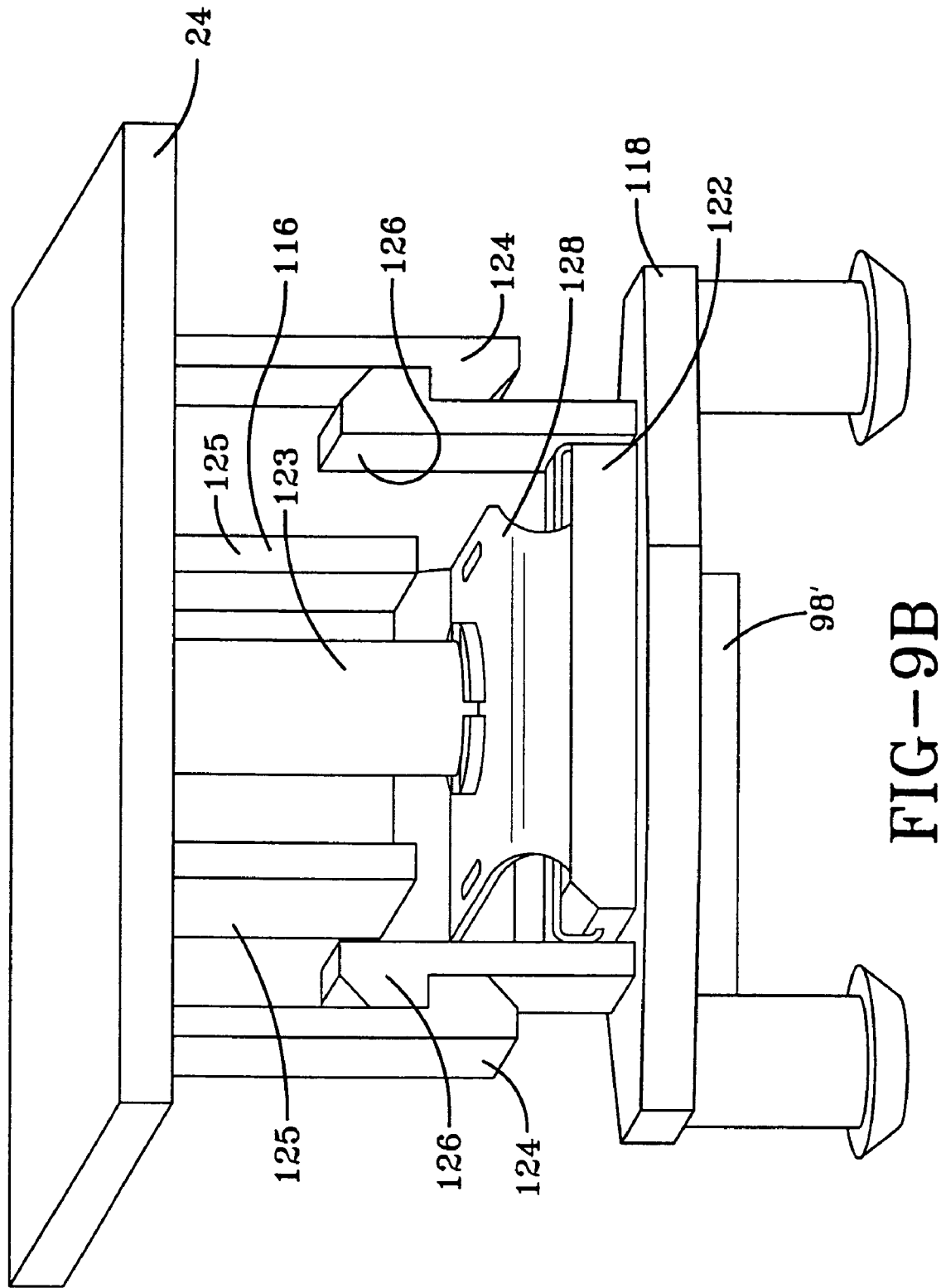
FIG. 9B is a perspective view of the switch assembly illustrated in FIG. 9A.

Referring to FIG. 9B, a guide pin 123 extends from the first switch portion 116 and passes through the fastener 122 such that the first switch portion 116 is movable relative to the second switch portion 118. An actuator 125 extends from the first switch portion 116 to actuate a flexible spring plate 128 essentially as described above.

The biasing member 120 mounted between the first switch portion 116 and the second switch portion 118 biases the first switch portion 116 relative to the second switch portion 118 as described in the previous embodiment. Notably, a flexible casing 98' as described above extends from the biasing member such that a plurality of switch assemblies 26c may also be molded as a single unit (FIG. 7b).

The first switch portion 116 includes a first hook 124 and the second switch portion 118 includes a second hook 126. The hooks 124,126 interact to limit movement of the first switch portion 116 relative to the second switch portion 118. Although hooks are shown in the Figures, it should be understood that other shaped members which limit movement of the switch portions 124,126 may additionally or alternatively be provided.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

We claim:

1. A snap-in switch assembly comprising:
   a first switch portion mounting a first contact;
   a first switch engagement member extending from said first switch portion engageable with an airbag cover wherein said first engagement member includes one or more substantially hook shaped engagement members snap-in engageable with one or more substantially hook shaped members extending from the airbag cover;
   a second switch portion, said second switch portion mounting a second contact corresponding to said first contact; and
   a second switch engagement member extending from said second switch portion engageable with a metallic steering wheel armature that is overmolded with a non-metallic material, wherein said second switch engagement member includes one or more substantially cylindrical shaped engagement members having an extended portion, said one or more substantially cylindrical shaped engagement members snap-in engageable with one or more apertures defined by the overmolded steering wheel armature wherein said first switch portion is movable relative to said second switch portion, said first switch portion includes one or more first hooks and said second switch portion includes one or more second hooks, said first and second hooks snap-in engage when said airbag cover is attached to said overmolded steering wheel armature and interact to limit movement of said first switch portion relative to said second switch portion.

2. The switch assembly according to claim 1 further comprising a biasing member to bias said first switch portion relative to said second switch portion.

3. The switch assembly according to claim 2 wherein said biasing member includes a coil spring.

* * * * *